United States Patent
Elshafie et al.

(10) Patent No.: US 12,471,069 B2
(45) Date of Patent: Nov. 11, 2025

(54) RANDOMIZATION OF RECONFIGURABLE INTELLIGENT SURFACE (RIS) SIGNALS

(71) Applicant: QUALCOMM Incorporated, San Diego, CA (US)

(72) Inventors: Ahmed Elshafie, San Diego, CA (US); Muhammad Sayed Khairy Abdelghaffar, San Jose, CA (US); Yu Zhang, San Diego, CA (US); Hung Dinh Ly, San Diego, CA (US); Alexandros Manolakos, Escondido, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 422 days.

(21) Appl. No.: 18/055,994

(22) Filed: Nov. 16, 2022

(65) Prior Publication Data

US 2024/0163850 A1 May 16, 2024

(51) Int. Cl.
*H04W 72/044* (2023.01)
*H04B 7/04* (2017.01)

(52) U.S. Cl.
CPC ...... *H04W 72/044* (2013.01); *H04B 7/04013* (2023.05)

(58) Field of Classification Search
CPC .. H04B 7/04013; H04B 7/0695; H04B 7/145; H04W 16/26; H04W 16/28; H04W 24/02; H04W 72/044
See application file for complete search history.

(56) References Cited

U.S. PATENT DOCUMENTS

| | | | |
|---|---|---|---|
| 12,294,436 B2 * | 5/2025 | Yao | H04B 7/0695 |
| 2024/0388327 A1 * | 11/2024 | Kim | H04B 7/06952 |
| 2025/0007565 A1 * | 1/2025 | Kim | H04W 16/28 |
| 2025/0047328 A1 * | 2/2025 | Medra | H04B 7/04013 |
| 2025/0096852 A1 * | 3/2025 | Tong | H04B 7/06952 |
| 2025/0150119 A1 * | 5/2025 | Lee | H04B 17/309 |

* cited by examiner

*Primary Examiner* — Allahyar Kasraian
(74) *Attorney, Agent, or Firm* — Patterson+ Sheridan, L.L.P.

(57) ABSTRACT

Certain aspects of the present disclosure provide techniques for randomization of reconfigurable intelligent surface (RIS) signals. A method for wireless communication includes determining a random reflection parameter for each of one or more RISs. The random reflection parameter is random over time for the one or more RISs. The method includes applying random values of the random reflection parameter at different times at each of the one or more RISs.

27 Claims, 13 Drawing Sheets

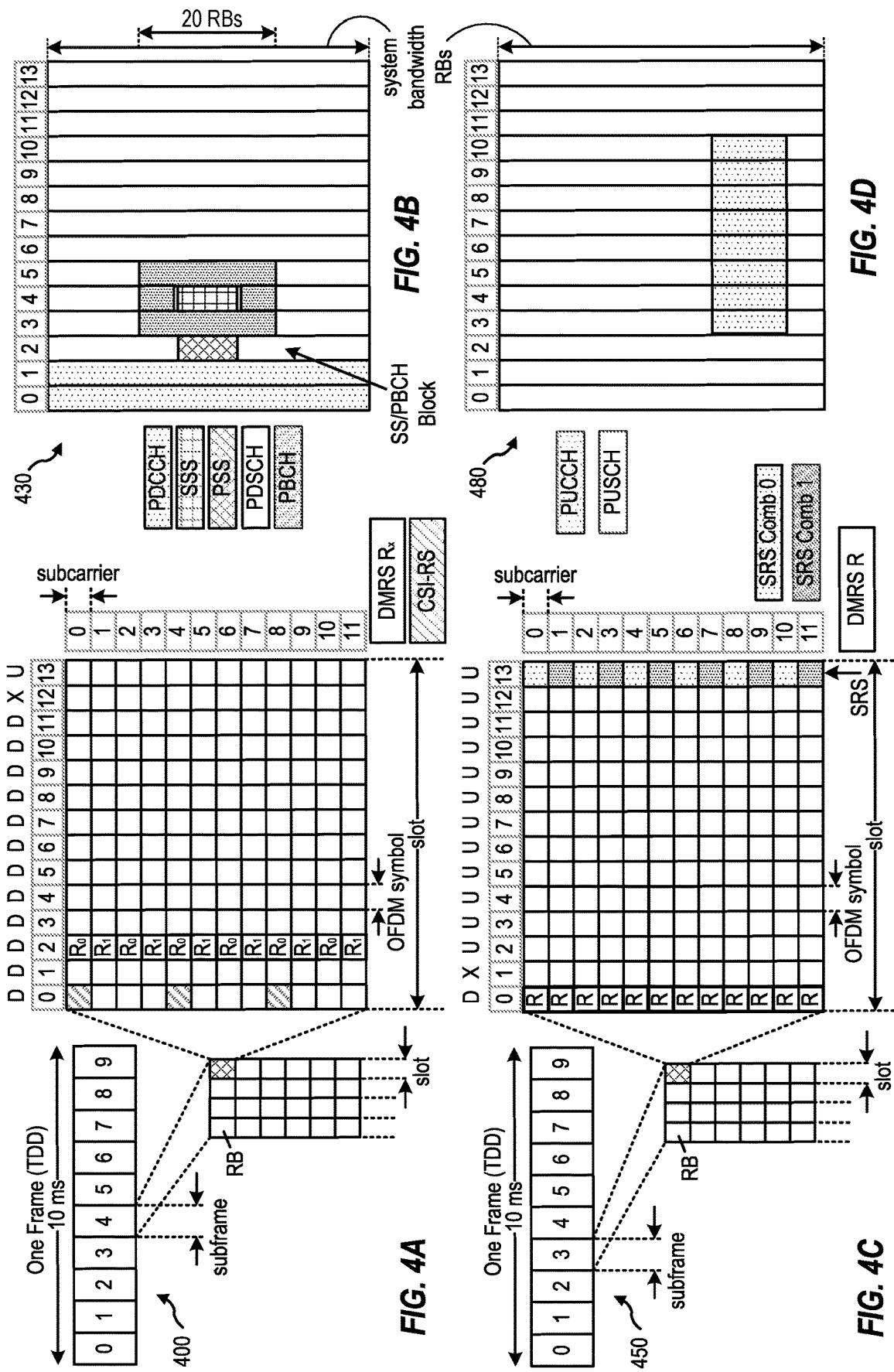

RANDOMIZATION OF RECONFIGURABLE INTELLIGENT SURFACE (RIS) SIGNALS

BACKGROUND

Field of the Disclosure

Aspects of the present disclosure relate to wireless communications, and more particularly, to techniques for reducing interference in systems with reconfigurable intelligent surfaces (RISs).

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication. The method includes determining a random reflection parameter for each of one or more reconfigurable intelligent surfaces (RISs). The random reflection parameter is random over time for the one or more RISs. The method further includes applying random values of the random reflection parameter at different times at each of the one or more RISs.

Another aspect provides a method for wireless communication. The method includes determining a random reflection parameter for each of one or more RISs. The random reflection parameter is random over time for the one or more RISs. The method further includes obtaining a reflected transmission and identifying a RIS, of the one or more RISs, based on the random reflection parameter.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

DETAILED DESCRIPTION

Aspects of the present disclosure provide apparatuses, methods, processing systems, and computer-readable mediums for reducing interference in wireless communication systems with one or more RISs. For example, aspects of the present disclosure provide for randomization of the RIS signals.

In certain wireless communication systems (e.g., 5g NR systems), beam forming is used to increase throughput. Beam forming may results in increased power consumption due to the use of active antenna units (AAUs). RISs can be used to extended coverage of the wireless communication system without significantly increasing the power consumption. As discussed in more detail herein with respect to FIGS. 5A-5B, a RIS is a near passive device that reflects an impinging wave to a desired direction. As discussed in more detail below with respect to FIGS. 5A-7B, the direction that the RIS reflects the impinging wave can be controlled by applying voltages RIS elements.

A RIS may include multiple different sub-panels. In addition, a wireless communication system may include multiple RISs.

Aspects of the present disclosure provide techniques for randomization of RIS signals to reduce interference in wireless communication systems with one or more RISs. For example, each RIS and/or sub-MS can apply a random reflection parameter. The random reflection parameters is randomized over time, such that different values of the random reflection are applied at different times. Further, at a given time, the different RISs and/or the different sub-RISs apply different values of the random reflection parameter. Accordingly, the signals reflected by the different RISs and/or sub-RISs are randomized such that the different signals can be distinguished. Further, the randomization of the random reflection parameter can be deterministic, such that other devices in the wireless communication network, such as UEs and network entities (e.g., a base station), are aware of the different values of the random reflection parameter applied at the different RISs and/or sub-RISs at different times and, therefore, can identify the particular MS and/or sub-RIS that reflected a received signal.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
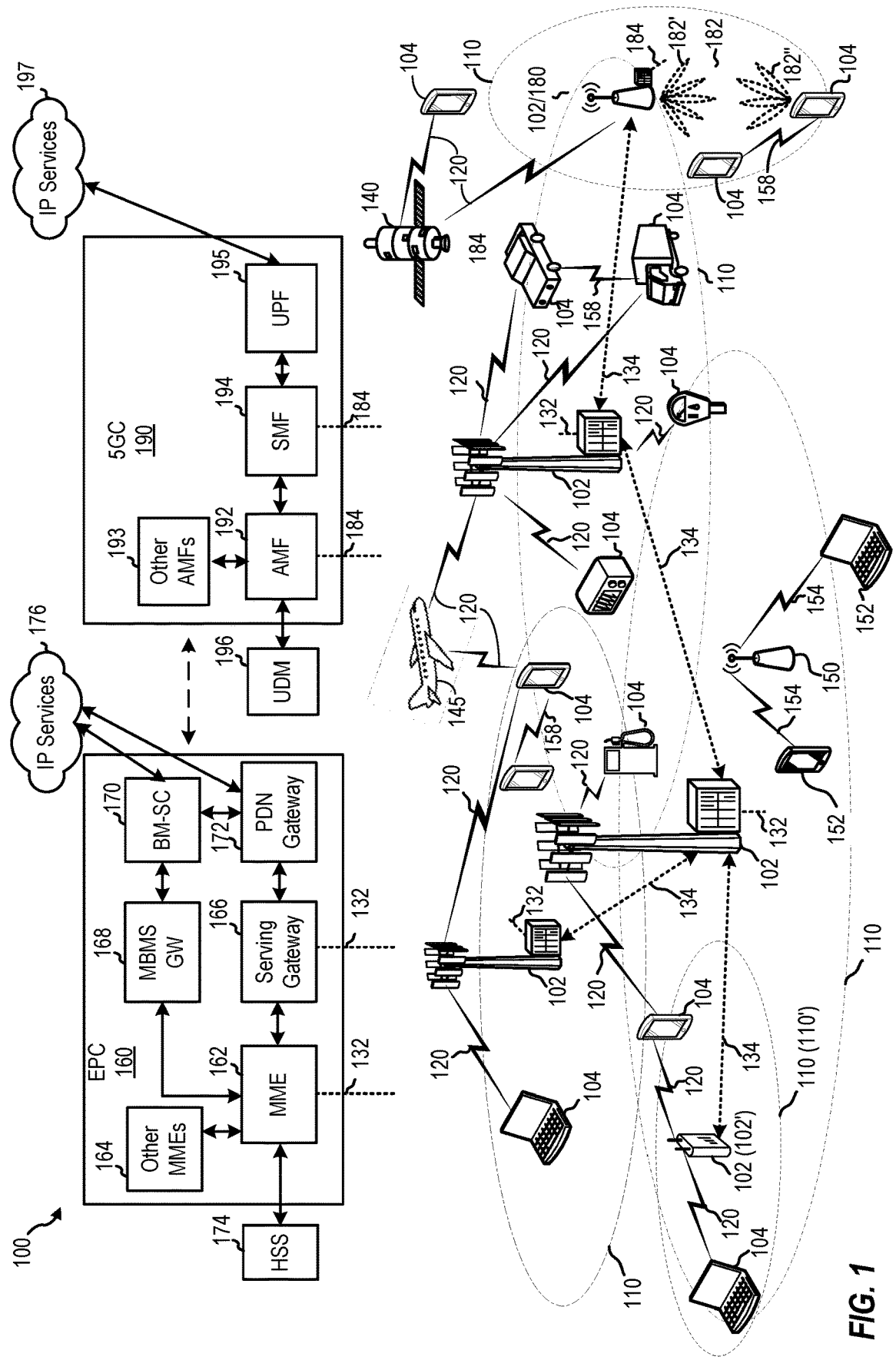
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
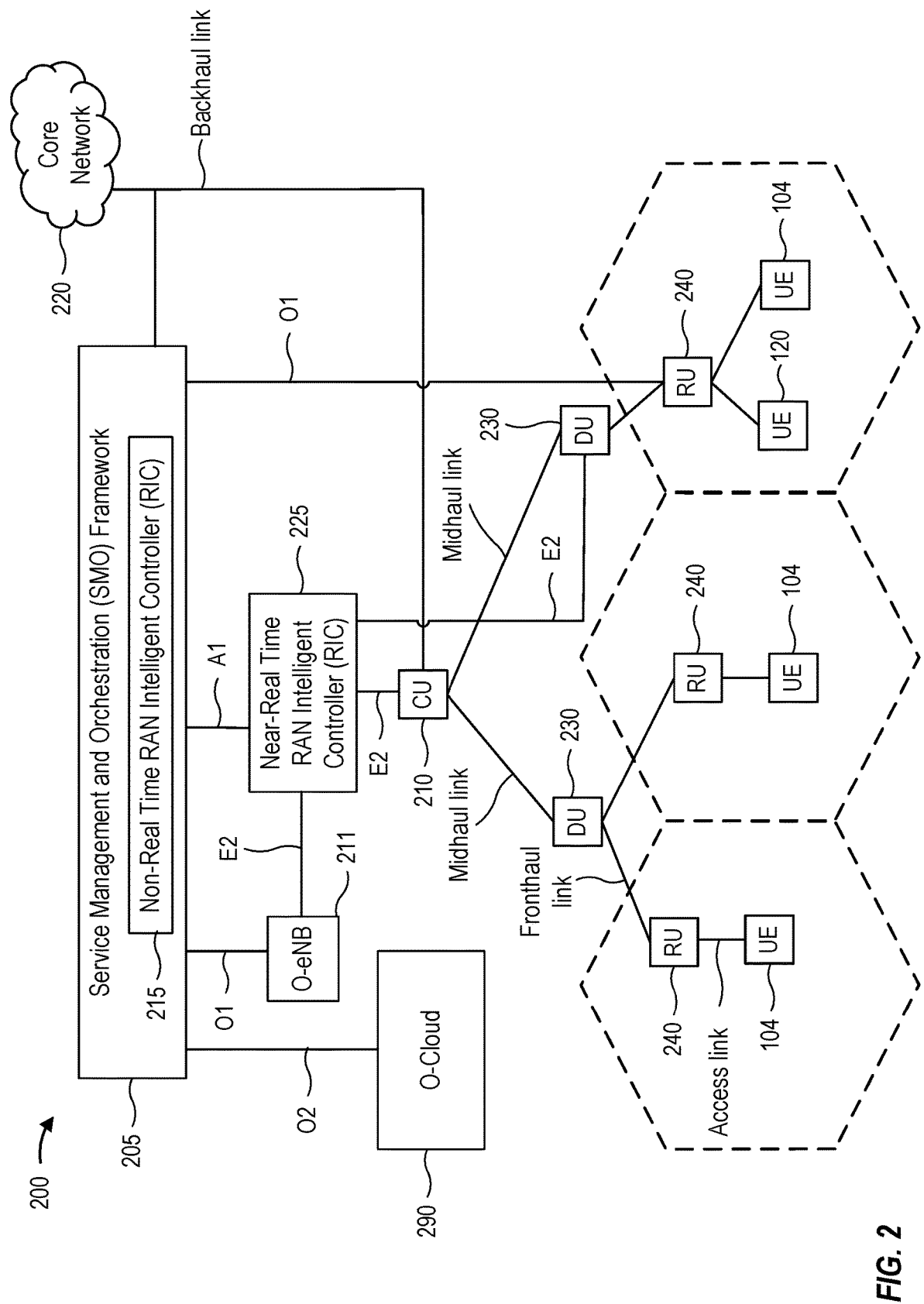
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (0-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT MC 225, the Non-RT RIC 215 may receive parameters or external enrichment information from external servers. Such information may be utilized by the Near-RT MC 225 and may be received at the SMO Framework 205 or the Non-RT MC 215 from non-network data sources or from network functions. In some examples, the Non-RT MC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
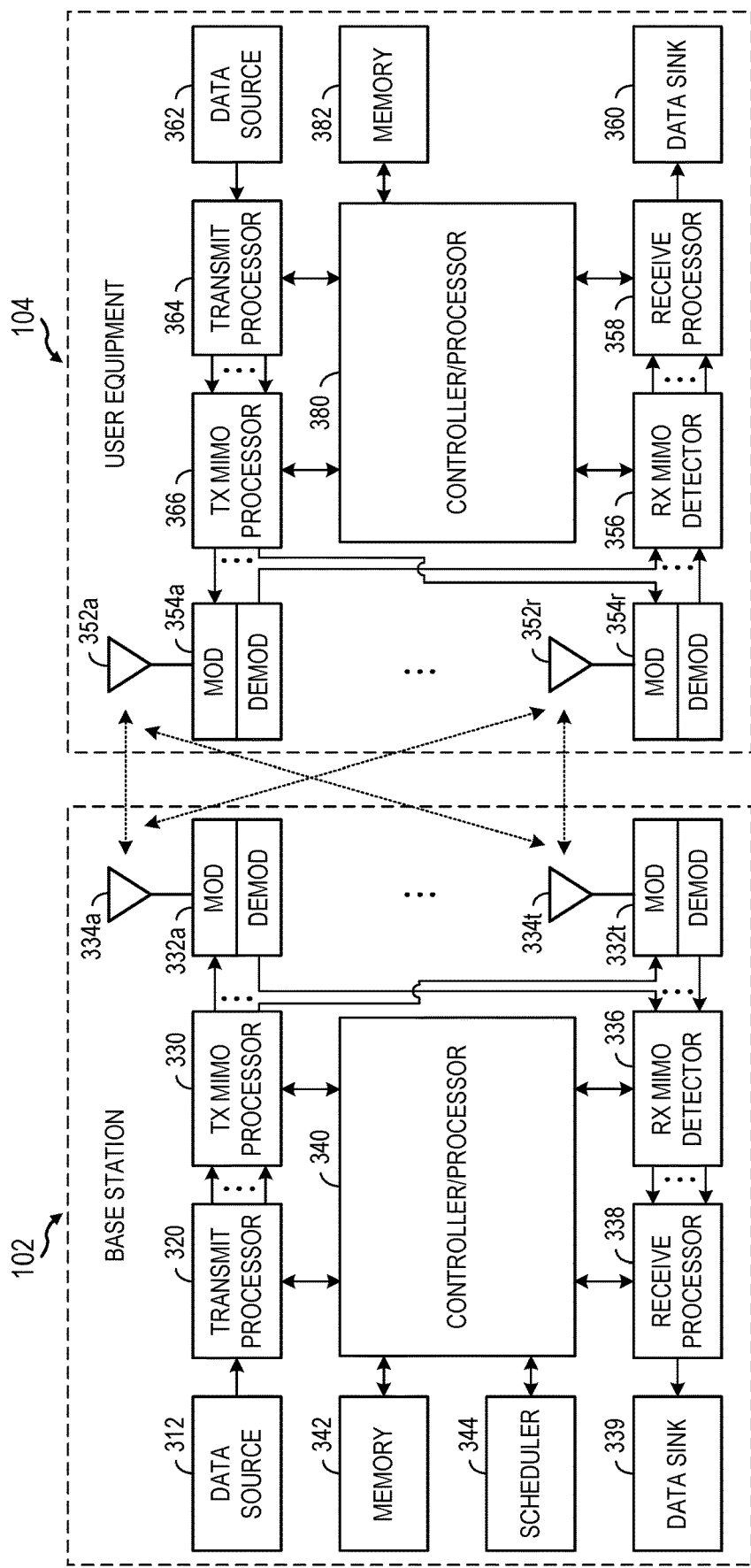
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of sub carriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of Massive Multiple Input Multiple Output (MIMO)

$5^{th}$ generation (5G) new radio (NR) massive multiple input multiple output (MIMO) is an extension of MIMO, which groups together antennas (e.g., at a transmitter device and a receiver device) to provide better throughput and spectrum efficiency. The massive MIMO expands beyond conventional systems by adding a much higher number of antennas. The higher number of antennas helps focus energy, which brings drastic improvements in throughput and efficiency. Along with the increased number of antennas, both network and user equipments (UEs) implement more complex designs to coordinate MIMO operations. The benefits of the massive MIMO to the network and the UEs may include increased network capacity and improved coverage.

Although there are several benefits of the massive MIMO, there are also some challenges associated with the massive MIMO. For example, since a high beamforming gain is achieved by using active antenna units (AAUs), which may include power consuming hardware (e.g., individual radio frequency (RF) chains per antenna port), there is a significant increase in power consumption due to the use of AAUs.

Overview of a Reconfigurable Intelligent Surface (RIS)

As noted above, massive multiple input multiple output (MIMO) increases throughput. For example, MIMO can achieve high beamforming gain by using active antenna units (AAUs) and can operate with individual radio frequency (RF) chains for each antenna port. Unfortunately, the use of AAUs may significantly increase power consumption.

To further such advantages and extend coverage, reconfigurable intelligent surfaces (RISs) may be deployed to reflect impinging waves in desired directions. In some cases, RISs may operate without substantial power consumption when they operate passively to only reflect or refract beams from a transmitter toward a receiver.

Figure 5A:
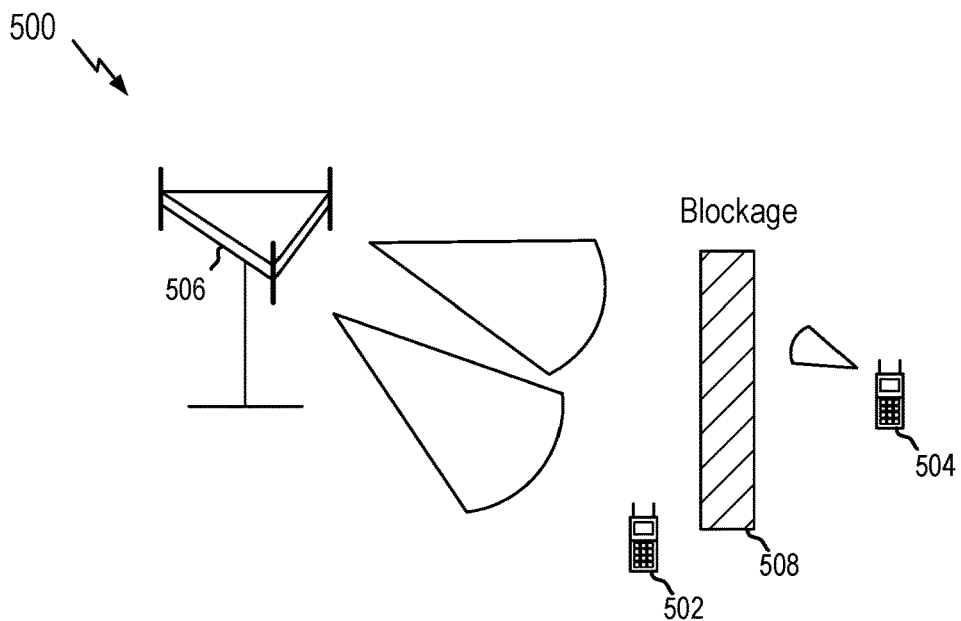
FIG. 5A depicts an example wireless communication network with blockage.

FIG. 5A illustrates an example of communication blockage between wireless communication devices in a wireless communication system 500 (e.g., such as wireless communication network 100 illustrated in FIG. 1). As shown, impeded by a blockage 508, a first network entity 506 (a gNB) may only be able to transmit to a first UE 502 and may not be able to reach a second UE 504, as the blockage 508 prevents signals from the first network entity 506 from reaching the second UE 504. The blockage 508 also prevents the first UE 502 from performing sidelink communications with the second UE 504. As such, the second UE 504 may not be able to communicate with the first network entity 506 nor with the first UE 502.

Figure 5B:
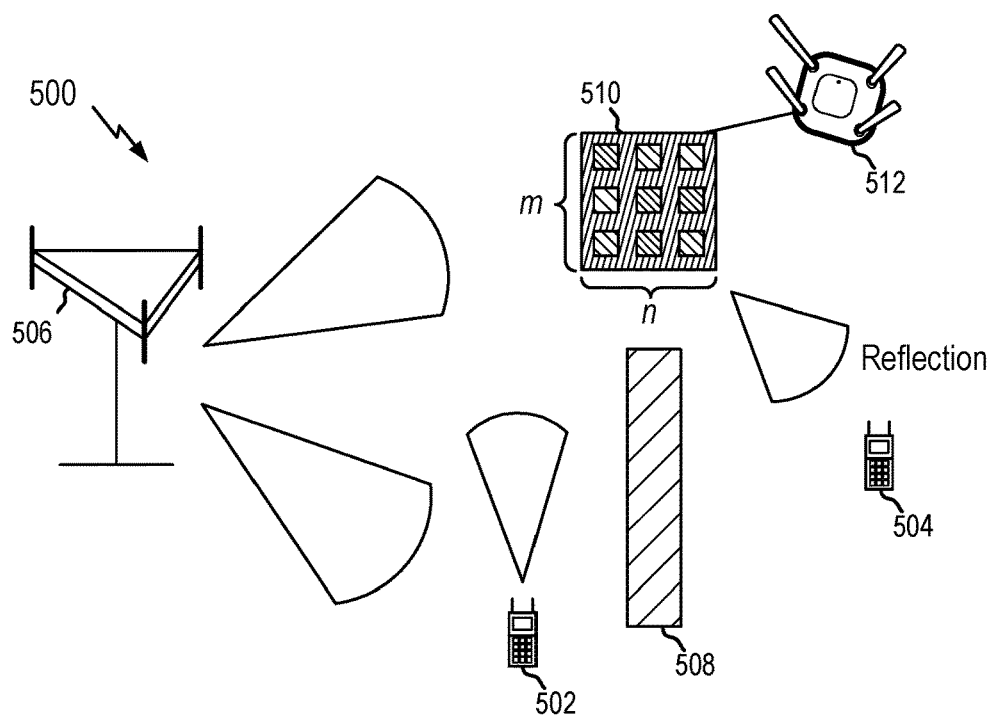
FIG. 5B depicts an example wireless communication network with a RIS to overcome a blockage.

FIG. 5B illustrates an example of using a RIS to overcome a blockage in the wireless communication system 500. As shown, a RIS 510 may be introduced in the wireless communication system 500 to reflect, or otherwise re-radiate, radio signals to bypass the blockage 508. For example, communications between the first network entity 506 and the second UE 504 may be enabled by the RIS 510 reflecting, or re-radiating, one or more beams from the first network entity 506 toward the second UE 504 and vice versa. Furthermore, the RIS 510 can also enable the first UE 502 and the second UE 504 to perform sidelink communications between each other.

The RIS 510 may perform passive beamforming. As shown, RIS 510 includes an array of RIS element, such as an m×n rectangular matrix of RIS elements. The RIS 510 may receive signal power from the transmitter (e.g., the first network entity 506, the first UE 502, and/or the second UE 504) proportional to the number of RIS elements thereon. When the RIS 510 reflects or refracts a radio signal, the RIS elements cause phase shifts (1) to apply beamforming or precoding to the radio signal. The phase shifts are controlled by precoding weights (e.g., a multiplier or an offset of time delay) applied to the RIS elements. For an array of RIS elements, such as the m×n rectangular matrix, for example, a respective precoding weight may be generated or specified for each of the RIS element by a RIS controller 512.

Figure 6A:
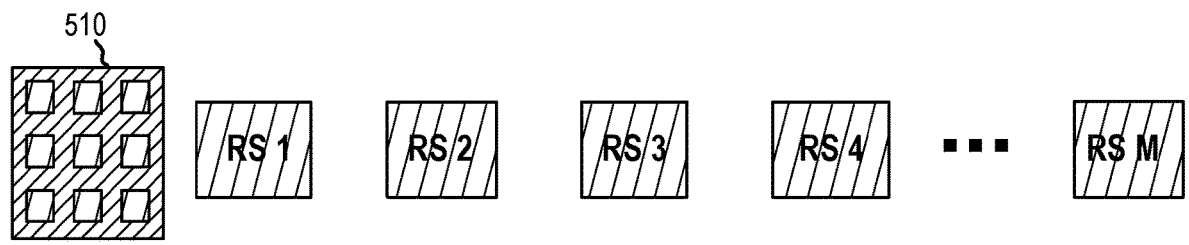
FIG. 6A depicts an example time division multiplexed (TDM'd) reference signals for a training procedure for a RIS.
Figure 6B:
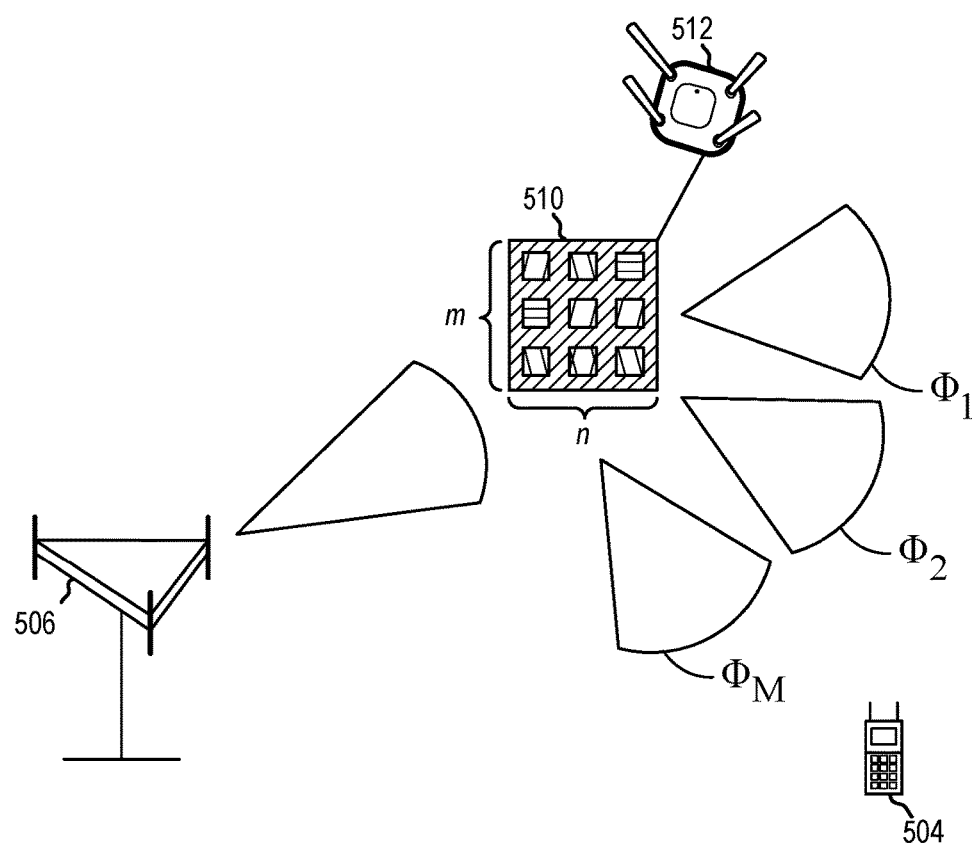
FIG. 6B depicts an example training procedure for a RIS.

As shown in FIG. 6A, RIS 510 can be trained using reference signals (RSs), such as using RS 1, RS 2, TS 3, RS 4, . . . , RS M. In the example illustrated in FIG. 6B, the first network entity 506 and/or a UE, such as the second UE 504, may train multiple RIS elements of the RIS 510 to determine an optimal RIS configuration (e.g., for directing a signal received from a transmitting device to a receiving device). For example, in downlink operation, the first network entity 506 may send multiple RSs to the RIS 510. The RIS 510 reflects these RS to the second UE 504. The RIS controller 512 may change weights or coefficient values (e.g., amplitude and phase) across the RIS elements for each RS occasion, such that the RIS 510 reflects the RS 1 RS M with different beams (i.e., different phase shifts, $\Phi_1$, $\Phi_2$, $\Phi_3$, . . . , $\Phi_M$, respectively). A strongest beam of the different beams may be declared as a beam corresponding to a highest receive signal metric. For example, the second UE 502 may report feedback of signal quality measurements of the different beams to the first network entity 506 to select a transmit receive beam pair (e.g., a transmit beam of the UE 504 and receive beam of the first network entity 506).

For uplink operation (not shown), the second UE 504 may send the multiple RSs to the RIS 510 and the RIS 510 may then reflect these RSs to the first network entity 506 with different beams for beam training.

For sidelink operation (not shown), the second UE 504 may send the multiple RSs to the RIS 510 and the RIS 510 may then reflect these RSs to the first UE 502 with different beams for beam training. Similarly, the first UE 502 may send the multiple RSs to the RIS 510 and the RIS 510 may then reflect these RSs to the second UE 504 with different beams for beam training.

One type of beam management training is referred to as "P1" beam acquisition. Another type of beam management training is referred to as "P2" beam refinement.

For beam acquisition (P1), the RS used may be synchronization signal block (SSB). The number of SSB beam sweeping occasions may be increased when there are multiple RISs deployed in the cell. For example, the number of SSB beam sweeping occasions=[(number of RISs in the cell)×(number of RIS beams)]+(number of gNB beams). The SSBs can be transmitted in SSB burst sets. Multiple SSB burst sets can be transmitted in a time division multiplexed (TDM'd) manner (e.g., with 0 ms, 5 ms, 10 ms, 15 ms, etc., time offset between different SSB burst sets) or using a different synchronization raster. The different SSB burst sets may be used for beam sweeping with the RIS in an active state (ON), beam sweeping with the RIS in an inactive state (OFF), beam sweeping with gNB beam repetition, and/or beam sweeping without gNB beam repetition. The RIS can also sweep the reflections of the SSBs to discover the best reflection beam for the different gNB beams.

For the beam refinement (P2), the RS used may be the channel state information reference signal (CSI-RS). After the beam refinement, the network can acquire an accurate beam pair link between the gNB and UE and distinguish which UEs communicate directly with the gNB and which UEs communicate with the gNB via a RIS (e.g., by beam sweeping different RISs turned ON and OFF).

For the first network entity 506 and the second UE 504 that do not have a direct channel between them, and that communicate via a RIS, the channel received at the UE can be represented as:

$$y = H_{RIS}\Phi H_{gNB} x + n = \left[\sum_{p=0}^{P-1} \varphi_p h_p^{(RIS)} \tilde{h}_p^{(gNB)}\right] x + n, \text{ where:}$$

$$H_{gNB} = \begin{bmatrix} \tilde{h}_0^{(gNB)} \\ \vdots \\ \tilde{h}_{P-1}^{(gNB)} \end{bmatrix}$$

for a P×N gNB-to-RIS channel matrix, where P is a number of RIS sub-panels (or sub-RISs) and N is a number of gNB antenna ports, where:

$$\Phi = \text{diag}(\varphi_0, \ldots, \varphi_{P-1})$$

for a P×P diagonal matrix representing phase changes across the elements of the RIS sub-panels, where:

$$H_{RIS} = [h_0^{(RIS)}, h_1^{(RIS)}, \ldots, h_{P-1}^{(RIS)}]$$

for a M×P RIS-to-UE channel matrix, and where M is the number of UE antennas.

Accordingly, for a given gNB precoding matrix, V, (rank and precoding matrix) and RIS phase matrix $\Phi$, the UE can report feedback (e.g., channel quality indicator (CQI)) to the gNB.

Accordingly, for beam management, the first network entity 506 and the second UE 504 can perform the beam discovery (P1) and beam refinement (P2) to acquire the downlink analog RIS beam. The UE can acquire the uplink beam based on beam correspondence with a downlink link beam.

After acquiring the analog RIS beam, the per-MS sub-panel channel can be acquired. For example, the first network entity 506 can transmit N-port CSI-RS resource with P repetitions in the time domain. CSI-RS repetition is used to estimate the channel for the different patterns of MS sub-panels turned ON and OFF.

Figure 7A:
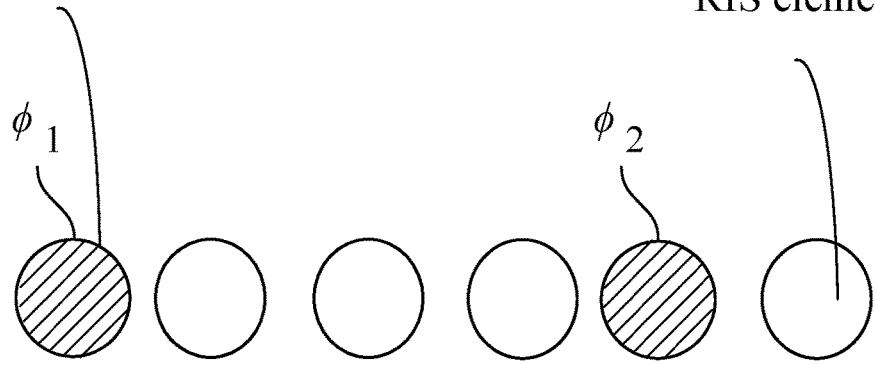
FIG. 7A illustrates a pattern representing active RIS elements and inactive RIS elements.
Figure 7B:
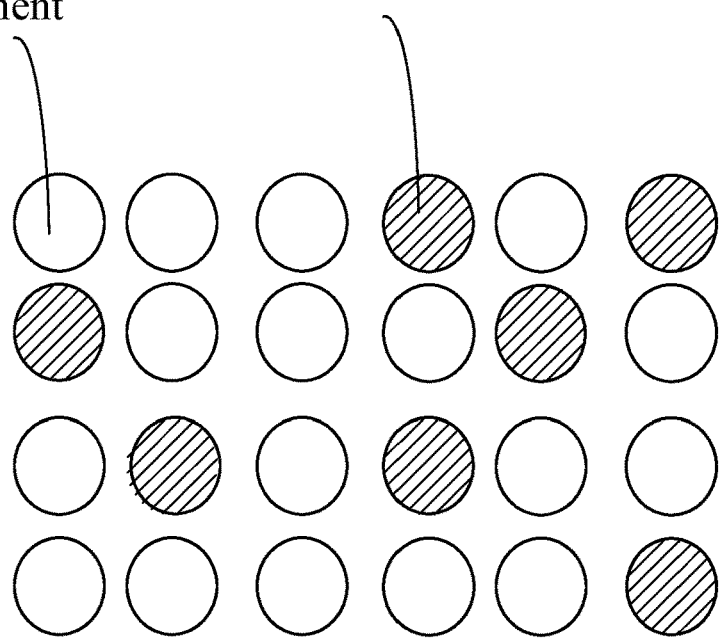
FIG. 7B illustrates another pattern representing active RIS elements and inactive RIS elements.
Figure 8A:
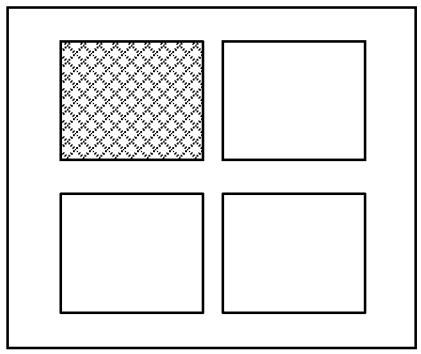
FIGS. 8A-8D depict an example ON/OFF pattern of sub-RISs.
Figure 8B:
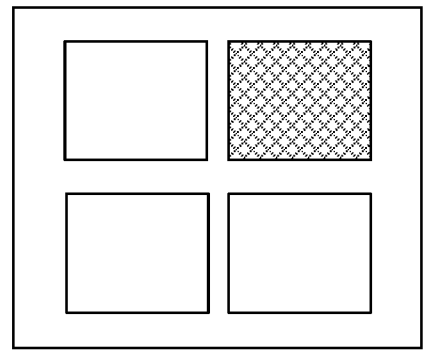
Figure 8C:
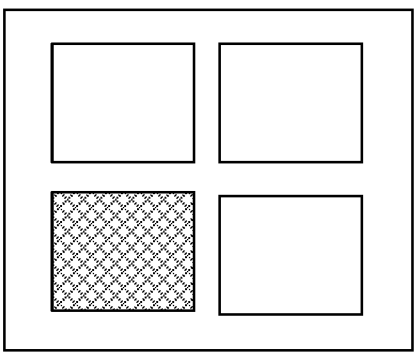
Figure 8D:
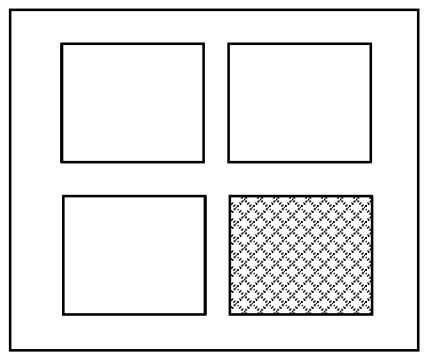

A MS sub-panel corresponds to a subset of RIS elements. In certain aspects, first network entity 506 transmits an indication of a bitmaps to MS controller 512 to indicate the ON-OFF pattern of MS sub-panels. FIG. 7A illustrates an example with six MS elements, where two MS elements are active and four RIS elements are inactive. As illustrated in FIG. 7B, again assuming six MS elements, four different patterns may be defined (e.g., and configured via RRC). One of the four patterns may be selected using 2 bits. In an illustrative example in FIGS. 8A-8D, the RIS sub-panel ON-OFF pattern is (1 0 0 0), (0 1 0 0), (0 0 1 0), (0 0 0 1), where a "1" represents active or ON MS element and a "0" represents an inactive or OFF MS element. The MS sub-panel ON-OFF patterns may be used for CSI-RS repetitions 0, 1, 2, 3, respectively. The per-MS sub-panel channel may be given by $$h_p^{(RIS)} \tilde{h}_p^{(gNB)}$$

for a given MS sub-panel i and a given gNB beam p.

Watermarking on MS sub-panels can be used to orthogonalize channel responses of different RIS sub-panels. For example, different orthogonal cover codes (OCC) can be applied by different RIS sub-panels when reflecting CSI-RS. In an illustrative example, four RIS sub-panels may apply OCC [1, 1, 1, 1] for CSI-RS repetition 0, OCC [1, −1, 1, −1] for CSI-RS repetition 1, OCC [1, 1, −1, −1] for CSI-RS repetition 2; and OCC [1, −1, −1, 1] for CSI-RS repetition 3. The UE estimates then estimated the channel based on the OCC as c1*y1; c2*y2, c3*y3, and c4*y4, respectively, giving $y1=h_0^{(RIS)}\tilde{h}_0^{(gNB)}+h_1^{(RIS)}\tilde{h}_1^{(gNB)}+h_2^{(RIS)}\tilde{h}_2^{(gNB)}+h_3^{(RIS)}\tilde{h}_3^{(gNB)}$; $y2=h_0^{(RIS)}\tilde{h}_0^{(gNB)}-h_1^{(RIS)}\tilde{h}_1^{(gNB)}+h_2^{(RIS)}\tilde{h}_2^{(gNB)}-h_3^{(RIS)}\tilde{h}_3^{(gNB)}$, $y3=h_0^{(RIS)}\tilde{h}_0^{(gNB)}+h_1^{(RIS)}\tilde{h}_1^{(gNB)}-h_2^{(RIS)}\tilde{h}_2^{(gNB)}-h_3^{(RIS)}\tilde{h}_3^{(gNB)}$ and $y4=h_0^{(RIS)}\tilde{h}_0^{(gNB)}-h_1^{(RIS)}\tilde{h}_1^{(gNB)}-h_2^{(RIS)}\tilde{h}_2^{(gNB)}+h_3^{(RIS)}\tilde{h}_3^{(gNB)}$, respectively.

The UE can compute CSI based on measurements of the different CSI-RSs and report the CSI to the network. For example, the UE 504 may compute the composite channel across the RIS sub-panels as:

$$\sum_{p=0}^{P-1} \varphi_p h_p^{(RIS)} \tilde{h}_p^{(gNB)}$$

with different hypotheses of φ (e.g., $\varphi_0, \ldots, \varphi_{p-1}$). Each phase value, could come from a given alphabet (e.g., 1, −1, j, −j) or each phase combination (e.g., $\varphi_0, \ldots, \varphi_{p-1}$) could come from a given alphabet (e.g., a downlink Type-I P-port rank-1 codebook).

The CSI feedback reported by the UE may include rank indicator (RI), precoding matrix indicator (PMI), RIS sub-panel phase value (e.g., $\varphi_0, \ldots, \varphi_{p-1}$) CQI, and the link for the composite channel. The UE may perform compression of the CSI before reporting the network.

Based on the channel state feedback received from the UE, the network can calculate the composite channel, determine a precoding matrix to use, and determine the RIS phase values.

For uplink channel state feedback, beamformed CSI-RS are precoded by a precoding matrix V selected based on the previous CSF from the UE and the MS sub-panels are set to the MS phase matrix Φ. The UE can then report feedback (e.g., CQI) for the CSI-RS.

For a UE with a direct channel with the network, the UE received channel is given by:

$$y = (H_d + H_{RIS} \Phi H_{gNB})x + n = \left[ H_d + \sum_{p=0}^{P-1} \varphi_p h_p^{(RIS)} \tilde{h}_p^{(gNB)} \right] x + n$$

The gNB may transmit CSI-RS and/or the UE may transmit sounding reference signal (SRS) with repetitions for different ON-OFF RIS sub-panel patterns. The gNB or UE calculates the composite channel as:

$$\left[ H_d + \sum_{p=0}^{P-1} \varphi_p h_p^{(RIS)} \tilde{h}_p^{(gNB)} \right]$$

In order to provide accurate per RIS sub-panel channel estimation, the CSI-RS/SRS repetition timing and RIS ON-OFF (or OCC watermarking) timing should be aligned. In some aspects, the network can provide signaling to the RIS controller of the RIS sub-panel ON-OFF pattern or the OCC watermarking, and the timing aligned to the CSI-RS or SRS repetition timing. The signaling can be provided semi-statically, with a period and offset (e.g., slot offset or symbol offset) to configured the RIS sub-panel ON-OFF pattern or OCC watermarking. Alternatively, the signaling can be provided dynamically, indicating the RIS sub-panel ON-OFF pattern or OCC watermarking. For example, the per panel phase ($\phi_0, \phi_1, \ldots, \phi_{P-1}$) can be signaled, where $\phi_i \in \{0\} \cup$ $$\left\{ e^{\frac{j2\pi q}{Q}} \mid q = 0, \ldots, Q-1 \right\}.$$

In some cases, the reflection or refraction direction may be controlled by a network entity (e.g., a BS) or a UE. The reflection angle may be controlled by applying a control voltage set to the RIS elements. For the downlink, the positions of the first network entity 506 and RIS 510 can be assumed to be fixed and, therefore, the incident angle on the RIS 510 is fixed. To reflect the downlink signal to the second UE 504, with different beams with different reflection angles, different downlink control voltage sets, $V_i^{(DL)}$, are applied to the RIS elements.

For the uplink or sidelink, the positions of the second UE 504 and RIS 510 can be assumed to be fixed and, therefore, the incident angle on the MS 510 is fixed. To reflect the uplink signal to the first network entity 506, or the sidelink signal to the first UE 502, with different beams with different reflection angles, different uplink control (UL) voltage sets, $V_i^{(UL)}$, or different sidelink control voltage sets, $V_i^{(SL)}$, are applied to the MS elements.

Aspects Related Randomization of Reconfigurable Intelligent Surface (RIS) Signals As discussed herein, some wireless communication systems may include multiple reconfigurable intelligent surfaces (RISs). Further, a RIS may have multiple sub-RISs (or RIS sub-panels) composed of a subset of RIS elements. The multiple RISs and/or sub-RISs may be managed by a single RIS controller or by multiple RIS controllers.

Aspects herein provide for randomization of signals from different RISs and different sub-RISs to allow signals from the different RISs and different sub-RISs to be distinguishable from each other and to reduce interference.

In certain aspects, a random signature is used by the different RISs and different sub-RISs. The random signature is a reflection parameter that is randomized over time.

Figure 9:
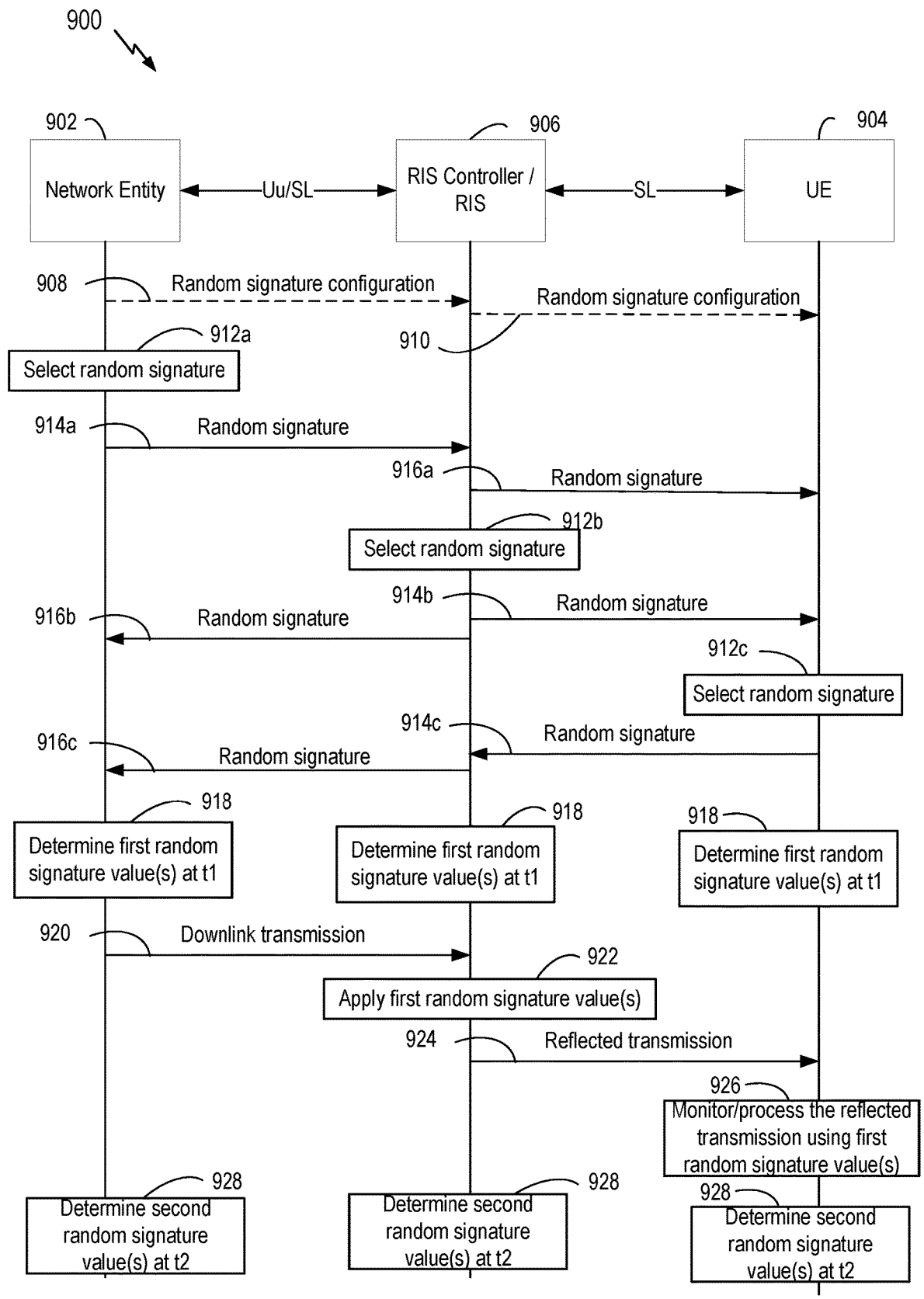
FIG. 9 depicts an example call flow for wireless communication.

FIG. 9 depicts a process flow 900 for communications in a network between a network entity 902, a user equipment (UE) 904, and a RIS controller 906. In some aspects, the network entity 902 may be an example of the BS 102 depicted and described with respect to FIGS. 1 and 3, a disaggregated base station depicted and described with respect to FIG. 2, or a programmable logical controller (PLC). Similarly, the UE 904 may be an example of UE 104 depicted and described with respect to FIGS. 1 and 3. However, in other aspects, UE 104 may be another type of wireless communications device and BS 102 may be another type of network entity or network node, such as those described herein. The RIS controller 906 may be an example RIS controller 512 depicted and described with respect to FIGS. 5B and 6B. For simplicity, in FIG. 9, the RIS and RIS controller are shown together. It should be understood that a RIS and RIS controller may not be colocated, and that a RIS controller can be associated with multiple RISs and sub-RISs.

In some aspects, the random signature is selected by network entity 902 (e.g., a base station or a PLC), at 912a, and signaled to a RIS controller 906, at 914a, and to the UE 904 at 916a. In some aspects, the random signature is selected by the UE 904, at 912c, and signaled to the network entity 902, at 916c, and to the RIS controller 906, at 914c. In some aspects, the random signature is selected by the RIS controller 906, at 912b, and signaled to the network entity 902, at 916b, and to the UE 904, at 914b. In some examples, the random signature is signaled as a parameter "Random-List".

Although the random signature is randomized over time, the randomization of the signature can be deterministic and known the RIS controller, the network entity, and the UE. That is, different RISs and sub-RISs may each use a different random signature that is randomized over time. Thus, for a given signal at a given time instance, different RISs or sub-RISs may apply different values of the random reflection parameter.

As shown in the call flow 900, at 918, each of the network entity 902, the RIS controller 906, and the UE 904, determine a first random signature value, or multiple values for different RISs and sub-RISs, at a first time instance t1. For downlink, at 920, the network entity 902 can send a downlink transmission to the RIS 906. At 922, the RIS 906 applies the first random signature value(s) to the respective sub-RISs and reflects the downlink transmission, at 924, to the UE 904. The UE 904 monitors and processes the reflected downlink transmission using the first random signature value(s). For a subsequent signal at a subsequent time instance, the different RISs or sub-RISs a next random value of the random reflection parameter. As shown in the call flow 900, at 928, each of the network entity 902, the RIS controller 906, and the UE 904, determine a second random signature value, or multiple values for different RISs and sub-RISs, at a first time instance t2.

While downlink is shown in the call flow 900, it should be understood that the random signature can be used in the same way for an uplink transmission from the UE 904 to the network entity 902 or a sidelink transmission between the UE 904 and another UE.

In some aspects, the random signature is randomized each instance. In some aspects, the random signature remains fixed for a duration and is randomized to a next value after the duration. The duration may be configured by a base station, a PLC, a UE, or a RIS controller.

The random reflection parameter may be orthogonal cover codes (OCCs) applied to reflections at each of the RISs and sub-RISs over time. The random reflection parameter may be different active and inactive (ON-OFF) configurations applied to each of the RISs and sub-RISs over time.

The random reflection parameter may be random frequency hopping applied to reflections at each of the RISs and sub-RISs over time. For example, at a first time instance, n, a impinging signal at the RIS or sub-RIS is reflected at a first frequency (e.g., subband), y, and in a next time instance an impinging signal at the RIS or sub-MS is reflected to a frequency hopped location. The frequency hopping may be hopped by band, bandwidth part (BWP), and/or component carrier (CC).

The random reflection parameter can be a random beamforming configuration (e.g., random phases, $\varphi$ and/or quasi colocation (QCL)) applied at each of the RISs and sub-RISs over time. The random beamforming configuration beamforms reflected signals by the MS to different areas (e.g., zones) supported by the base station.

The random reflection parameter randomized values can be determined based on one or more configured or signaled parameters. For example, the random reflection parameter may be randomized as a function of an identifier (ID) of the MS, a sub-MS ID, a transmitter ID (e.g., a base station ID for downlink or a source UE ID for uplink or sidelink), a receiver ID (e.g., a base station ID for uplink or a destination UE ID for downlink or sidelink), a zone ID of a zone in which the RIS is located, a zone ID of a zone in which the transmitter device is located, and/or a zone ID of a zone in which the receiver device is located.

Accordingly, for a given MS or sub-RIS, the base station (and/or a PLC or other network entity), the MS controller, and the UE can each independently determine the random reflection parameter values over time. Accordingly, the RIS controller can apply the respective different random reflection parameter values at the corresponding RISs and sub-RISs at different times, and the UE and base station (or PLC or other network entity) can monitor reflected signals (e.g., with the corresponding QCL, OCC, frequency, to process) and identify a respective RIS or sub-RIS the signal is coming from based on the determined random reflection parameter values.

In some aspects, the random signature configuration is configured as part of a resource configuration. For example, the random signature configuration may be configured as part of a sidelink resource pool configuration, a reference signal resource configuration, a reference signal resource set configuration, or a reference signal reporting configuration. The reference signal may be a sounding reference signal (SRS), a channel state information reference signal (CSI-RS), or a sidelink reference signal. The random signature configuration may include a set of random reflection parameters (the random reflection parameter may include the reflection parameter and information for randomization of the reflection parameter values, such as an initial reflection parameter value, a reflection parameter randomization function, a reflection parameter randomization table, a reflection parameter randomization sequence, a reflection pattern randomization pattern, or a combination thereof). As shown in the call flow 900, optionally, at 908, the network entity 902 sends the random signature configuration to the RIS controller 906 and, at 910, sends the random signature configuration to the UE 904 (e.g., via the RIS 906).

The RIS controller, base station, PLC, or UE may select one of the random reflection parameters from the set of configured random reflection parameters. In some aspects, the RIS controller, base station, PLC, or UE selects the random reflection pattern based on one or more capabilities (e.g., a reduced capability (RedCap) of the RIS controller) of the RIS controller and/or its associated RISs and sub-RISs. In some aspects, the RIS controller, base station, PLC, or UE randomly selects the random reflection parameter from the set of random reflection parameters.

In some aspects, the random signature configuration may be configured per resource configuration. Accordingly, multiple random signature configurations may be configured.

In some examples, the random signature is selected based on one or more identifiers. For example, the random signature may selected based on a RIS ID, a sub-RIS ID, a transmitter ID (e.g., a base station ID for downlink or a source UE ID for uplink or sidelink), a receiver ID (e.g., a base station ID for uplink or a destination UE ID for downlink or sidelink), a zone ID of a zone in which the RIS is located, a zone ID of a zone in which the transmitter device is located, and/or a zone ID of a zone in which the receiver device is located. Accordingly, if the base station, PLC, RIS controller, and UE know the applicable ID or IDs, the base station, PLC, RIS controller, and UE can each determine the random signature. In this case, the random signature may not need to be signaled.

Example Operations

Figure 10:
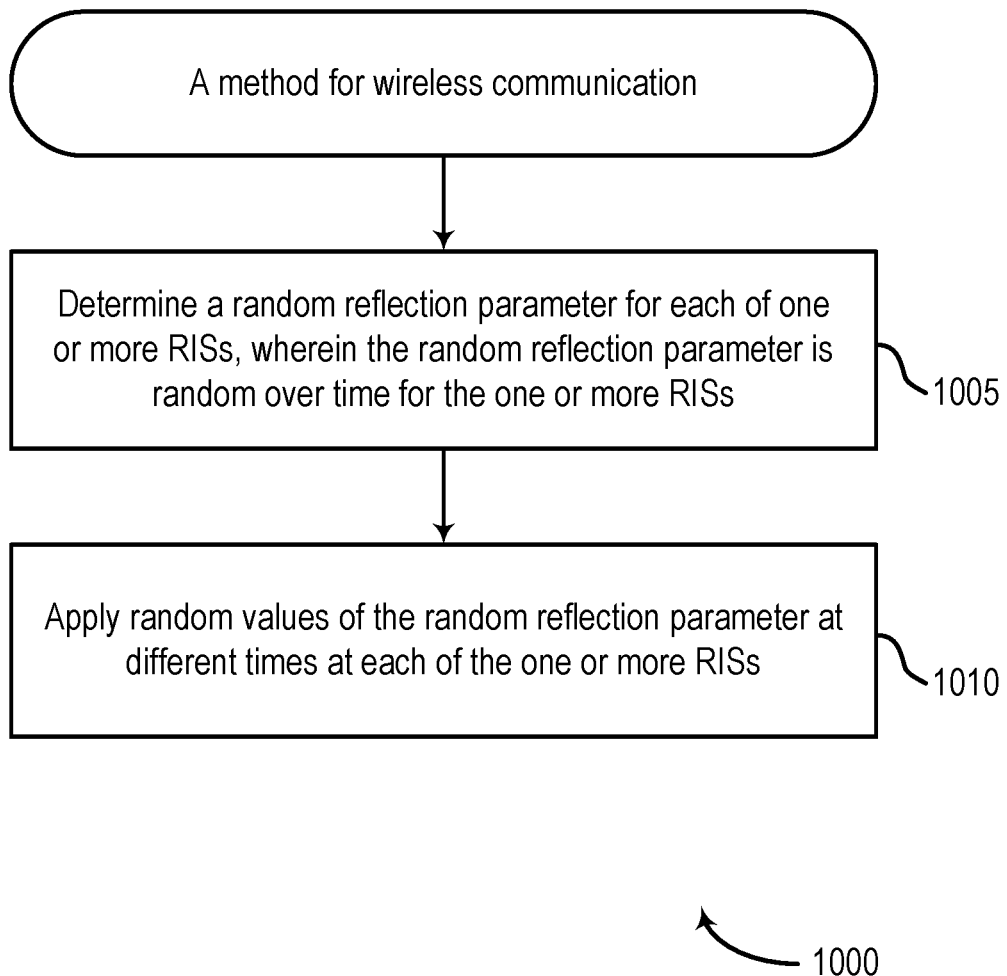
FIG. 10 depicts a method for wireless communications.

FIG. 10 shows an example of a method 1000 for wireless communication. In some aspects, the method 1000 is performed by a MS controller.

Method 1000 begins at step 1005 with determining a random reflection parameter for each of one or more RISs, wherein the random reflection parameter is random over time for the one or more RISs. In some cases, the operations of this step refer to, or may be performed by, circuitry for determining and/or code for determining as described with reference to FIG. 12.

Method 1000 then proceeds to step 1010 with applying random values of the random reflection parameter at different times at each of the one or more RISs. In some cases, the operations of this step refer to, or may be performed by, circuitry for applying and/or code for applying as described with reference to FIG. 12.

In some aspects, the method 1000 further includes applying random values of the random reflection parameter at different times at each of multiple sub-RISs of the one or more RISs, wherein each of the one or more RISs comprises a plurality of reflection elements, and wherein each of the multiple sub-RISs comprises a subset of the plurality of reflection elements. In some cases, the operations of this step refer to, or may be performed by, circuitry for applying and/or code for applying as described with reference to FIG. 12.

In some aspects, the method 1000 further includes receiving an indication from a network entity, a PLC, a UE, or a combination thereof. In some cases, the operations of this step refer to, or may be performed by, circuitry for receiving and/or code for receiving as described with reference to FIG. 12.

In some aspects, the method 1000 further includes determining the random reflection parameter based on the indication. In some cases, the operations of this step refer to, or may be performed by, circuitry for determining and/or code for determining as described with reference to FIG. 12.

In some aspects, the indication comprises a selected random reflection parameter.

In some aspects, the random reflection parameter comprises a random signature, a random OCC, a random frequency hopping, a random pattern of active and inactive panels, or a random beamforming.

In some aspects, the method 1000 further includes signaling the random reflection parameter to a network entity, a PLC, a UE, or a combination thereof. In some cases, the operations of this step refer to, or may be performed by, circuitry for signaling and/or code for signaling as described with reference to FIG. 12.

In some aspects, the method 1000 further includes determining random values of the random reflection parameter at different times based on a RIS ID of a given RIS, a sub-RIS ID of a given sub-RIS, a configured ID, a transmitter device ID, a receiver device ID, a zone ID of a given RIS, a zone ID of a transmitter device, a zone ID of a receiver device, or a combination thereof. In some cases, the operations of this step refer to, or may be performed by, circuitry for determining and/or code for determining as described with reference to FIG. 12.

In some aspects, the method 1000 further includes determining a duration that a random reflection parameter value is used before randomizing the random reflection parameter to a different value. In some cases, the operations of this step refer to, or may be performed by, circuitry for determining and/or code for determining as described with reference to FIG. 12.

In some aspects, the duration is configured by a RIS controller, a network entity, a PLC, or a UE.

In some aspects, the method 1000 further includes receiving one or more resource pool configurations, wherein each of the one or more resource pool configurations configures a list of one or more random reflection parameters, wherein determining the random reflection parameter comprises selecting the random reflection parameter from the list. In some cases, the operations of this step refer to, or may be performed by, circuitry for receiving and/or code for receiving as described with reference to FIG. 12.

In some aspects, the one or more resource pool configurations comprises one or more RS resource set configurations, one or more RS resource set configuration, one or more RS report configurations, one or more sidelink resource pool configurations, or a combination thereof.

In some aspects, selecting the random reflection parameter comprises randomly selecting the random reflection parameter from the list.

In some aspects, selecting the random reflection parameter comprises selecting the random reflection parameter from the list based on one or more capabilities of a RIS controller.

In some aspects, the method is performed by a RIS controller associated with the one or more RISs.

Figure 12:
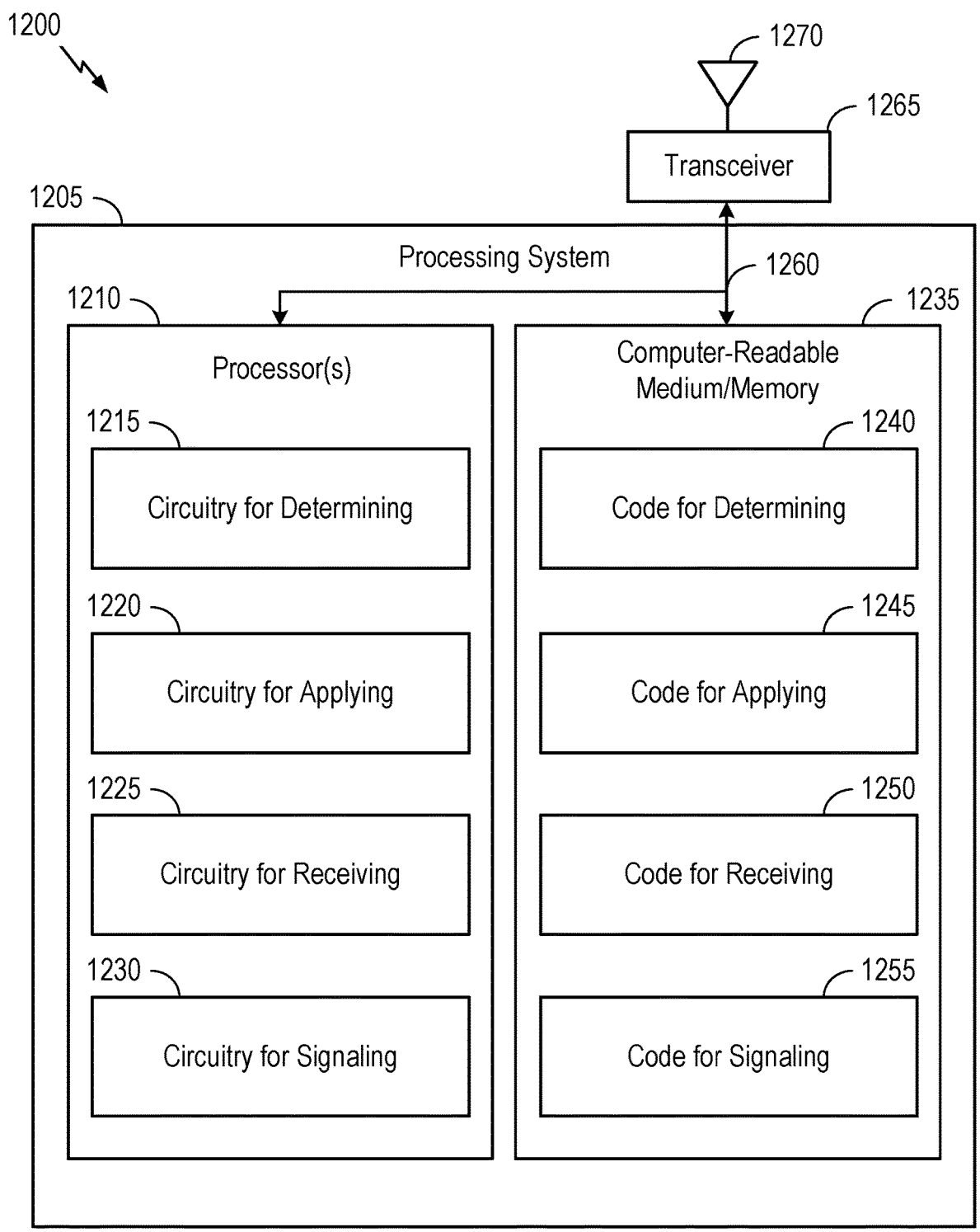
FIG. 12 depicts aspects of an example communications device.

In one aspect, method 1000, or any aspect related to it, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative steps are possible consistent with this disclosure.

Figure 11:
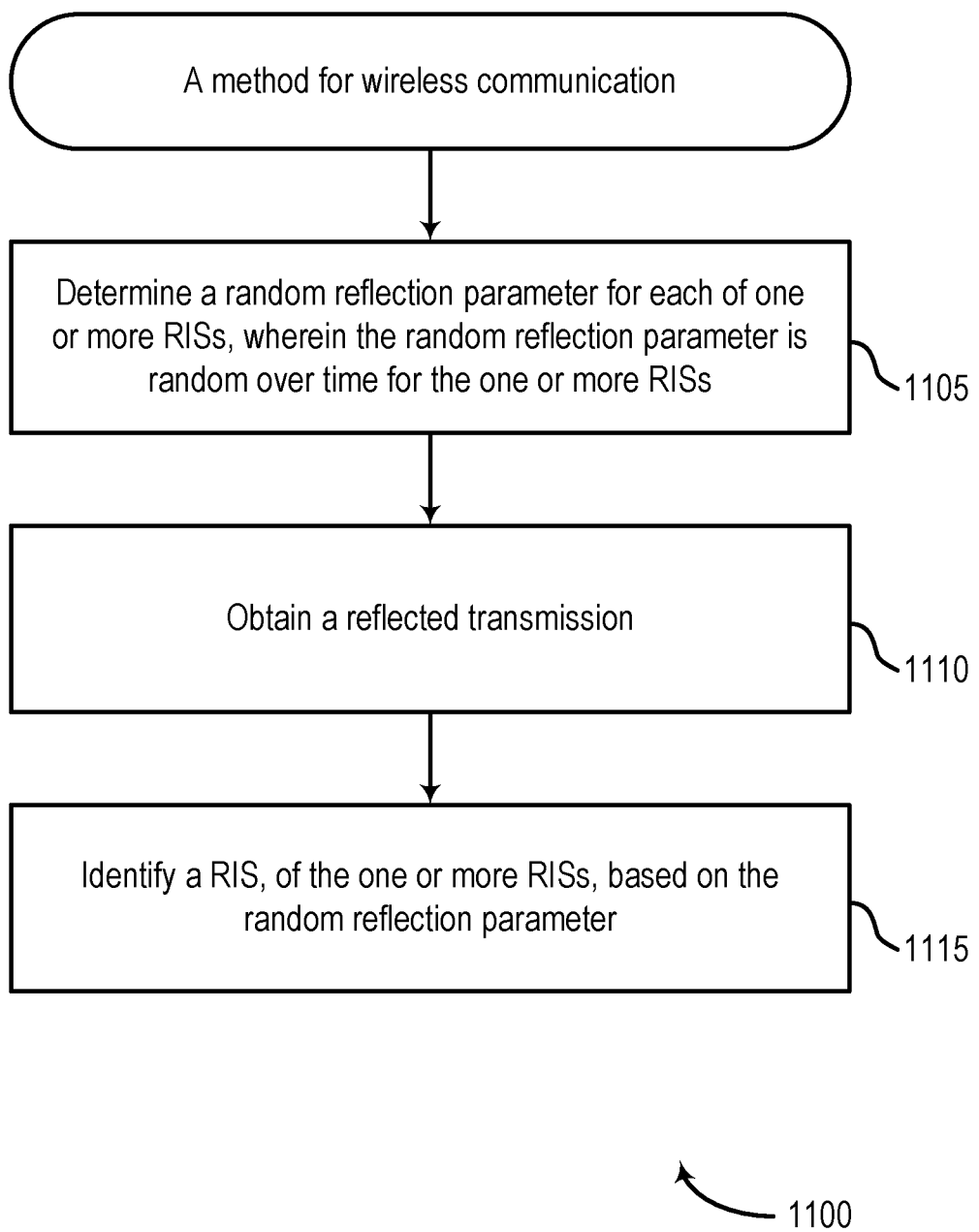
FIG. 11 depicts a method for wireless communications.

FIG. 11 shows an example of a method 1100 for wireless communication. In some examples, the method 1100 is performed by a network entity, such as a BS 102 of FIGS.

1 and 3, a disaggregated base station as discussed with respect to FIG. 2, or a UE, such as a UE 104 of FIGS. 1 and 3.

Method 1100 begins at step 1105 with determining a random reflection parameter for each of one or more RISs, wherein the random reflection parameter is random over time for the one or more RISs. In some cases, the operations of this step refer to, or may be performed by, circuitry for determining and/or code for determining as described with reference to FIG. 13.

Method 1100 then proceeds to step 1110 with obtaining a reflected transmission. In some cases, the operations of this step refer to, or may be performed by, circuitry for obtaining and/or code for obtaining as described with reference to FIG. 13.

Method 1100 then proceeds to step 1115 with identifying a RIS, of the one or more RISs, based on the random reflection parameter. In some cases, the operations of this step refer to, or may be performed by, circuitry for identifying and/or code for identifying as described with reference to FIG. 13.

In some aspects, the method 1100 further includes determining different random values of the random reflection parameter at different times for each of multiple sub-RISs of the one or more RISs, wherein each of the one or more RISs comprises a plurality of reflection elements, and wherein each of the multiple sub-RISs comprises a subset of the plurality of reflection elements. In some cases, the operations of this step refer to, or may be performed by, circuitry for determining and/or code for determining as described with reference to FIG. 13.

In some aspects, the method 1100 further includes identifying a sub-MS of the one or more RISs based on the different random values and the reflected transmission. In some cases, the operations of this step refer to, or may be performed by, circuitry for identifying and/or code for identifying as described with reference to FIG. 13.

In some aspects, the method 1100 further includes outputting an indication to a RIS-controller of the one or more RISs of the random reflection parameter. In some cases, the operations of this step refer to, or may be performed by, circuitry for outputting and/or code for outputting as described with reference to FIG. 13.

In some aspects, the random reflection parameter comprises a random signature, a random OCC, a random frequency hopping, a random pattern of active and inactive panels, or a random beamforming.

In some aspects, the method 1100 further includes receiving signaling indicating the random reflection parameter, wherein the determining the random reflection parameter is based on the signaling. In some cases, the operations of this step refer to, or may be performed by, circuitry for receiving and/or code for receiving as described with reference to FIG. 13.

In some aspects, the method 1100 further includes determining random values of the random reflection parameter at different times based on a MS ID of a given RIS, a sub-RIS ID of a given sub-RIS, a configured ID, a transmitter device ID, a receiver device ID, a zone ID of a given RIS, a zone ID of a transmitter device, a zone ID of a receiver device, or a combination thereof. In some cases, the operations of this step refer to, or may be performed by, circuitry for determining and/or code for determining as described with reference to FIG. 13.

In some aspects, the method 1100 further includes determining a duration that a random reflection parameter value is used before randomizing the random reflection parameter to a different value. In some cases, the operations of this step refer to, or may be performed by, circuitry for determining and/or code for determining as described with reference to FIG. 13.

In some aspects, the duration is configured by a RIS controller, a network entity, a PLC, or a UE.

In some aspects, the method 1100 further includes signaling one or more resource pool configurations, wherein each of the one or more resource pool configurations configures a list of one or more random reflection parameters, including the random reflection parameter. In some cases, the operations of this step refer to, or may be performed by, circuitry for signaling and/or code for signaling as described with reference to FIG. 13.

In some aspects, the one or more resource pool configurations comprises one or more RS resource set configurations, one or more RS resource set configuration, one or more RS report configurations, one or more sidelink resource pool configurations, or a combination thereof.

In some aspects, the method is performed by a network entity, a BS, a PLC, or a UE.

Figure 13:
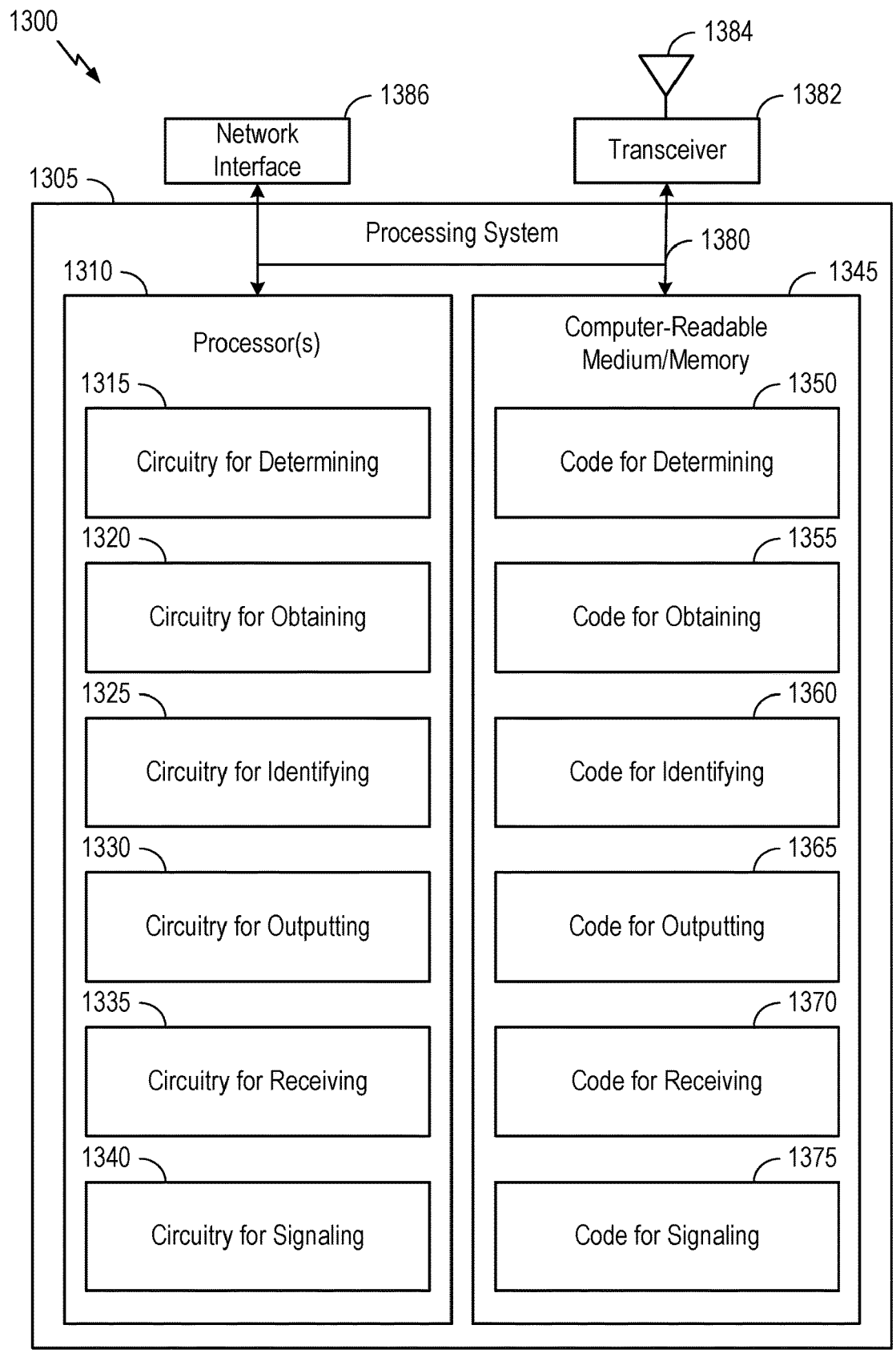
FIG. 13 depicts aspects of an example communications device.

In one aspect, method 1100, or any aspect related to it, may be performed by an apparatus, such as communications device 1300 of FIG. 13, which includes various components operable, configured, or adapted to perform the method 1100. Communications device 1300 is described below in further detail.

Note that FIG. 11 is just one example of a method, and other methods including fewer, additional, or alternative steps are possible consistent with this disclosure.

Example Communications Devices

FIG. 12 depicts aspects of an example communications device 1200. In some aspects, communications device 1200 is a RIS controller.

The communications device 1200 includes a processing system 1205 coupled to the transceiver 1265 (e.g., a transmitter and/or a receiver). The transceiver 1265 is configured to transmit and receive signals for the communications device 1200 via the antenna 1270, such as the various signals as described herein. The processing system 1205 may be configured to perform processing functions for the communications device 1200, including processing signals received and/or to be transmitted by the communications device 1200.

The processing system 1205 includes one or more processors 1210. In various aspects, the one or more processors 1210 may be representative of one or more of receive processor 358, transmit processor 364, TX MIMO processor 366, and/or controller/processor 380, as described with respect to FIG. 3. The one or more processors 1210 are coupled to a computer-readable medium/memory 1235 via a bus 1260. In certain aspects, the computer-readable medium/memory 1235 is configured to store instructions (e.g., computer-executable code) that when executed by the one or more processors 1210, cause the one or more processors 1210 to perform the method 1000 described with respect to FIG. 10, or any aspect related to it. Note that reference to a processor performing a function of communications device 1200 may include one or more processors 1210 performing that function of communications device 1200.

In the depicted example, computer-readable medium/memory 1235 stores code (e.g., executable instructions), such as code for determining 1240, code for applying 1245, code for receiving 1250, and code for signaling 1255. Processing of the code for determining 1240, code for applying 1245, code for receiving 1250, and code for signaling 1255 may cause the communications device 1200 to perform the method 1000 described with respect to FIG. 10, or any aspect related to it.

The one or more processors 1210 include circuitry configured to implement (e.g., execute) the code stored in the computer-readable medium/memory 1235, including circuitry such as circuitry for determining 1215, circuitry for applying 1220, circuitry for receiving 1225, and circuitry for signaling 1230. Processing with circuitry for determining 1215, circuitry for applying 1220, circuitry for receiving 1225, and circuitry for signaling 1230 may cause the communications device 1200 to perform the method 1000 described with respect to FIG. 10, or any aspect related to it.

Various components of the communications device 1200 may provide means for performing the method 1000 described with respect to FIG. 10, or any aspect related to it. For example, means for transmitting, sending or outputting for transmission may include transceivers 354 and/or antenna(s) 352 of the UE 104 illustrated in FIG. 3 and/or the transceiver 1265 and the antenna 1270 of the communications device 1200 in FIG. 12. Means for receiving or obtaining may include transceivers 354 and/or antenna(s) 352 of the UE 104 illustrated in FIG. 3 and/or the transceiver 1265 and the antenna 1270 of the communications device 1200 in FIG. 12.

FIG. 13 depicts aspects of an example communications device 1300. In some aspects, communications device 1300 is a network entity, such as a BS 102 of FIGS. 1 and 3, a disaggregated base station as discussed with respect to FIG. 2, or a user equipment, such as a UE 104 of FIGS. 1 and 3.

The communications device 1300 includes a processing system 1305 coupled to the transceiver 1382 (e.g., a transmitter and/or a receiver) and/or a network interface 1386. The transceiver 1382 is configured to transmit and receive signals for the communications device 1300 via the antenna 1384, such as the various signals as described herein. The network interface 1386 is configured to obtain and send signals for the communications device 1300 via communication link(s), such as a backhaul link, midhaul link, and/or fronthaul link as described herein, such as with respect to FIG. 2. The processing system 1305 may be configured to perform processing functions for the communications device 1300, including processing signals received and/or to be transmitted by the communications device 1300.

The processing system 1305 includes one or more processors 1310. In various aspects, one or more processors 1310 may be representative of one or more of receive processor 338, transmit processor 320, TX MIMO processor 330, and/or controller/processor 340, as described with respect to FIG. 3. The one or more processors 1310 are coupled to a computer-readable medium/memory 1345 via a bus 1380. In certain aspects, the computer-readable medium/memory 1345 is configured to store instructions (e.g., computer-executable code) that when executed by the one or more processors 1310, cause the one or more processors 1310 to perform the method 1100 described with respect to FIG. 11, or any aspect related to it. Note that reference to a processor of communications device 1300 performing a function may include one or more processors 1310 of communications device 1300 performing that function.

In the depicted example, the computer-readable medium/memory 1345 stores code (e.g., executable instructions), such as code for determining 1350, code for obtaining 1355, code for identifying 1360, code for outputting 1365, code for receiving 1370, and code for signaling 1375. Processing of the code for determining 1350, code for obtaining 1355, code for identifying 1360, code for outputting 1365, code for receiving 1370, and code for signaling 1375 may cause the communications device 1300 to perform the method 1100 described with respect to FIG. 11, or any aspect related to it.

The one or more processors 1310 include circuitry configured to implement (e.g., execute) the code stored in the computer-readable medium/memory 1345, including circuitry such as circuitry for determining 1315, circuitry for obtaining 1320, circuitry for identifying 1325, circuitry for outputting 1330, circuitry for receiving 1335, and circuitry for signaling 1340. Processing with circuitry for determining 1315, circuitry for obtaining 1320, circuitry for identifying 1325, circuitry for outputting 1330, circuitry for receiving 1335, and circuitry for signaling 1340 may cause the communications device 1300 to perform the method 1100 as described with respect to FIG. 11, or any aspect related to it.

Various components of the communications device 1300 may provide means for performing the method 1100 as described with respect to FIG. 11, or any aspect related to it. Means for transmitting, sending or outputting for transmission may include transceivers 332 and/or antenna(s) 334 of the BS 102 illustrated in FIG. 3 and/or the transceiver 1382 and the antenna 1384 of the communications device 1300 in FIG. 13. Means for receiving or obtaining may include transceivers 332 and/or antenna(s) 334 of the BS 102 illustrated in FIG. 3 and/or the transceiver 1382 and the antenna 1384 of the communications device 1300 in FIG. 13.

Example Clauses

Implementation examples are described in the following numbered clauses:

Clause 1: A method for wireless communication, comprising: determining a random reflection parameter for each of one or more RISs, wherein the random reflection parameter is random over time for the one or more RISs; and applying random values of the random reflection parameter at different times at each of the one or more RISs.

Clause 2: The method of Clause 1, further comprising: applying random values of the random reflection parameter at different times at each of multiple sub-RISs of the one or more RISs, wherein each of the one or more RISs comprises a plurality of reflection elements, and wherein each of the multiple sub-RISs comprises a subset of the plurality of reflection elements.

Clause 3: The method of any one of Clauses 1 and 2, further comprising: receiving an indication from a network entity, a PLC, a UE, or a combination thereof; and determining the random reflection parameter based on the indication.

Clause 4: The method of Clause 3, wherein the indication comprises a selected random reflection parameter.

Clause 5: The method of any one of Clauses 1-4, wherein the random reflection parameter comprises a random signature, a random OCC, a random frequency hopping, a random pattern of active and inactive panels, or a random beamforming.

Clause 6: The method of any one of Clauses 1-5, further comprising: signaling the random reflection parameter to a network entity, a PLC, a UE, or a combination thereof.

Clause 7: The method of any one of Clauses 1-6, further comprising: determining random values of the random reflection parameter at different times based on a RIS ID of a given RIS, a sub-RIS ID of a given sub-RIS, a configured ID, a transmitter device ID, a receiver device ID, a zone ID of a given RIS, a zone ID of a transmitter device, a zone ID of a receiver device, or a combination thereof.

Clause 8: The method of any one of Clauses 1-7, further comprising: determining a duration that a random reflection parameter value is used before randomizing the random reflection parameter to a different value.

Clause 9: The method of Clause 8, wherein the duration is configured by a RIS controller, a network entity, a PLC, or a UE.

Clause 10: The method of any one of Clauses 1-9, further comprising: receiving one or more resource pool configurations, wherein each of the one or more resource pool configurations configures a list of one or more random reflection parameters, wherein determining the random reflection parameter comprises selecting the random reflection parameter from the list.

Clause 11: The method of Clause 10, wherein the one or more resource pool configurations comprises one or more RS resource set configurations, one or more RS resource set configuration, one or more RS report configurations, one or more sidelink resource pool configurations, or a combination thereof.

Clause 12: The method of Clause 10, wherein selecting the random reflection parameter comprises randomly selecting the random reflection parameter from the list.

Clause 13: The method of Clause 10, wherein selecting the random reflection parameter comprises selecting the random reflection parameter from the list based on one or more capabilities of a RIS controller.

Clause 14: The method of any one of Clauses 1-13, wherein the method is performed by a RIS controller associated with the one or more RISs.

Clause 15: A method for wireless communication, comprising: determining a random reflection parameter for each of one or more RISs, wherein the random reflection parameter is random over time for the one or more RISs; obtaining a reflected transmission; and identifying a RIS, of the one or more RISs, based on the random reflection parameter.

Clause 16: The method of Clause 15, further comprising: determining different random values of the random reflection parameter at different times for each of multiple sub-RISs of the one or more RISs, wherein each of the one or more RISs comprises a plurality of reflection elements, and wherein each of the multiple sub-RISs comprises a subset of the plurality of reflection elements; and identifying a sub-RIS of the one or more RISs based on the different random values and the reflected transmission.

Clause 17: The method of any one of Clauses 15-16, further comprising: outputting an indication to a RIS-controller of the one or more RISs of the random reflection parameter.

Clause 18: The method of any one of Clauses 15-17, wherein the random reflection parameter comprises a random signature, a random OCC, a random frequency hopping, a random pattern of active and inactive panels, or a random beamforming.

Clause 19: The method of any one of Clauses 15-18, further comprising: receiving signaling indicating the random reflection parameter, wherein the determining the random reflection parameter is based on the signaling.

Clause 20: The method of any one of Clauses 15-19, further comprising: determining random values of the random reflection parameter at different times based on a RIS ID of a given RIS, a sub-RIS ID of a given sub-RIS, a configured ID, a transmitter device ID, a receiver device ID, a zone ID of a given RIS, a zone ID of a transmitter device, a zone ID of a receiver device, or a combination thereof.

Clause 21: The method of any one of Clauses 15-20, further comprising: determining a duration that a random reflection parameter value is used before randomizing the random reflection parameter to a different value.

Clause 22: The method of Clause 21, wherein the duration is configured by a RIS controller, a network entity, a PLC, or a UE.

Clause 23: The method of any one of Clauses 15-22, further comprising: signaling one or more resource pool configurations, wherein each of the one or more resource pool configurations configures a list of one or more random reflection parameters, including the random reflection parameter.

Clause 24: The method of Clause 23, wherein the one or more resource pool configurations comprises one or more RS resource set configurations, one or more RS resource set configuration, one or more RS report configurations, one or more sidelink resource pool configurations, or a combination thereof.

Clause 25: The method of any one of Clauses 15-24, wherein the method is performed by a network entity, a BS, a PLC, or a UE.

Clause 26: An apparatus, comprising: a memory comprising executable instructions; and a processor configured to execute the executable instructions and cause the apparatus to perform a method in accordance with any one of Clauses 1-25.

Clause 27: An apparatus, comprising means for performing a method in accordance with any one of Clauses 1-25.

Clause 28: A non-transitory computer-readable medium comprising executable instructions that, when executed by a processor of an apparatus, cause the apparatus to perform a method in accordance with any one of Clauses 1-25.

Clause 29: A computer program product embodied on a computer-readable storage medium comprising code for performing a method in accordance with any one of Clauses 1-25.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication, the method comprising:
    determining a random reflection parameter for each of one or more reconfigurable intelligent surfaces (RISs), wherein the random reflection parameter is random over time for the one or more RISs; and
    obtaining a reflected transmission; and
    identifying a RIS, of the one or more RISs, based on the random reflection parameter.

2. The method of claim 1, further comprising:
    determining different random values of the random reflection parameter at different times for each of multiple sub-RISs of the one or more RISs, wherein each of the one or more RISs comprises a plurality of reflection elements, and wherein each of the multiple sub-RISs comprises a subset of the plurality of reflection elements; and
    identifying a sub-RIS of the one or more RISs based on the different random values and the reflected transmission.

3. The method of claim 1, further comprising outputting an indication to a RIS-controller of the one or more RISs of the random reflection parameter.

4. The method of claim 1, wherein the random reflection parameter comprises a random signature, a random orthogonal cover code (OCC), a random frequency hopping, a random pattern of active and inactive panels, or a random beamforming.

5. The method of claim 1, further comprising receiving signaling indicating the random reflection parameter, wherein the determining the random reflection parameter is based on the signaling.

6. The method of claim 1, further comprising determining random values of the random reflection parameter at different times based on a RIS identifier (ID) of a given RIS, a sub-RIS ID of a given sub-RIS, a configured ID, a transmitter device ID, a receiver device ID, a zone ID of a given RIS, a zone ID of a transmitter device, a zone ID of a receiver device, or a combination thereof.

7. The method of claim 1, further comprising determining a duration that a random reflection parameter value is used before randomizing the random reflection parameter to a different value.

8. The method of claim 7, wherein the duration is configured by a RIS controller, a network entity, a programmable logic controller (PLC), or a user equipment (UE).

9. The method of claim 1, further comprising signaling one or more resource pool configurations, wherein each of the one or more resource pool configurations configures a list of one or more random reflection parameters, including the random reflection parameter.

10. The method of claim 9, wherein the one or more resource pool configurations comprises one or more reference signal (RS) resource set configurations, one or more RS resource set configuration, one or more RS report configurations, one or more sidelink resource pool configurations, or a combination thereof.

11. The method of claim 1, wherein the method is performed by a network entity, a base station (BS), a programmable logic controller (PLC), or a user equipment (UE).

12. An apparatus configured for wireless communication, the apparatus comprising:
    a memory comprising processor-executable instructions; and
    one or more processors configured to, individually or collectively, execute the processor-executable instructions and cause the apparatus to:
        determine a random reflection parameter for each of one or more reconfigurable intelligent surfaces (RISs), wherein the random reflection parameter is random over time for the one or more RISs;
        obtain a reflected transmission; and identify a RIS, of the one or more RISs, based on the random reflection parameter.

13. The apparatus of claim 12, wherein the one or more processors are further configured to, individually or collectively, cause the apparatus to:
 determine different random values of the random reflection parameter at different times for each of multiple sub-RISs of the one or more RISs, wherein each of the one or more RISs comprises a plurality of reflection elements, and wherein each of the multiple sub-RISs comprises a subset of the plurality of reflection elements; and
 identify a sub-RIS of the one or more RISs based on the different random values and the reflected transmission.

14. The apparatus of claim 12, wherein the one or more processors are further configured to, individually or collectively, cause the apparatus to output an indication to a RIS-controller of the one or more RISs of the random reflection parameter.

15. The apparatus of claim 12, wherein the random reflection parameter comprises a random signature, a random orthogonal cover code (OCC), a random frequency hopping, a random pattern of active and inactive panels, or a random beamforming.

16. The apparatus of claim 12, wherein the one or more processors are further configured to, individually or collectively, cause the apparatus to receive signaling indicating the random reflection parameter, wherein the determination of the random reflection parameter is based on the signaling.

17. The apparatus of claim 12, wherein the one or more processors are further configured to, individually or collectively, cause the apparatus to determine random values of the random reflection parameter at different times based on a RIS identifier (ID) of a given RIS, a sub-RIS ID of a given sub-RIS, a configured ID, a transmitter device ID, a receiver device ID, a zone ID of a given RIS, a zone ID of a transmitter device, a zone ID of a receiver device, or a combination thereof.

18. The apparatus of claim 12, wherein the one or more processors are further configured to, individually or collectively, cause the apparatus to determine a duration that a random reflection parameter value is used before randomizing the random reflection parameter to a different value.

19. The apparatus of claim 18, wherein the duration is configured by a RIS controller, a network entity, a programmable logic controller (PLC), or a user equipment (UE).

20. The apparatus of claim 12, wherein the one or more processors are further configured to, individually or collectively, cause the apparatus to signal one or more resource pool configurations, wherein each of the one or more resource pool configurations configures a list of one or more random reflection parameters, including the random reflection parameter.

21. The apparatus of claim 20, wherein the one or more resource pool configurations comprises one or more reference signal (RS) resource set configurations, one or more RS resource set configuration, one or more RS report configurations, one or more sidelink resource pool configurations, or a combination thereof.

22. The apparatus of claim 12, wherein the apparatus comprises a network entity, a base station (BS), a programmable logic controller (PLC), or a user equipment (UE).

23. A non-transitory computer-readable medium storing computer-executable code for wireless communication, the computer-executable code comprising:
 code for determining a random reflection parameter for each of one or more reconfigurable intelligent surfaces (RISs), wherein the random reflection parameter is random over time for the one or more RISs; and
 code for obtaining a reflected transmission; and
 code for identifying a RIS, of the one or more RISs, based on the random reflection parameter.

24. The non-transitory computer-readable medium of claim 23, further comprising:
 code for determining different random values of the random reflection parameter at different times for each of multiple sub-RISs of the one or more RISs, wherein each of the one or more RISs comprises a plurality of reflection elements, and wherein each of the multiple sub-RISs comprises a subset of the plurality of reflection elements; and
 code for identifying a sub-RIS of the one or more RISs based on the different random values and the reflected transmission.

25. The non-transitory computer-readable medium of claim 23, further comprising code for outputting an indication to a RIS-controller of the one or more RISs of the random reflection parameter.

26. The non-transitory computer-readable medium of claim 23, wherein the random reflection parameter comprises a random signature, a random orthogonal cover code (OCC), a random frequency hopping, a random pattern of active and inactive panels, or a random beamforming.

27. An apparatus for wireless communication, the apparatus comprising:
 means for determining a random reflection parameter for each of one or more reconfigurable intelligent surfaces (RISs), wherein the random reflection parameter is random over time for the one or more RISs; and
 means for obtaining a reflected transmission; and
 means for identifying a RIS, of the one or more RISs, based on the random reflection parameter.

* * * * *